US007899476B2

(12) United States Patent
Cheng et al.

(10) Patent No.: US 7,899,476 B2
(45) Date of Patent: Mar. 1, 2011

(54) METHOD FOR PROCESSING PUSH NOTIFICATION IN MULTIMEDIA MESSAGE SERVICE

(75) Inventors: Weiming Cheng, Guangdong (CN); Dawei Li, Guangdong (CN)

(73) Assignee: Huawei Technologies Co., Ltd., Shenzhen (CN)

(*) Notice: Subject to any disclaimer, the term of this patent is extended or adjusted under 35 U.S.C. 154(b) by 616 days.

(21) Appl. No.: 11/619,757

(22) Filed: Jan. 4, 2007

(65) Prior Publication Data
US 2007/0180037 A1  Aug. 2, 2007

Related U.S. Application Data

(63) Continuation of application No. PCT/CN2005/001000, filed on Jul. 7, 2005.

(30) Foreign Application Priority Data
Jul. 9, 2004  (CN) ......................... 2004 1 0069703

(51) Int. Cl.
H04W 4/00 (2009.01)
(52) U.S. Cl. .................................... 455/466; 455/412.1
(58) Field of Classification Search ................ 455/466, 455/412.1, 412.2, 414.1, 414.2, 424, 426.1, 455/456.1, 456.2, 556.1, 556.2, 414.4; 709/206, 709/207; 370/428, 429, 522, 474–477
See application file for complete search history.

(56) References Cited

U.S. PATENT DOCUMENTS 5,719,918 A * 2/1998 Serbetciouglu et al. ..... 380/271

6,400,942 B1 * 6/2002 Hansson et al. .......... 455/426.1
6,920,331 B1 * 7/2005 Sim et al. .................... 455/466

(Continued)

FOREIGN PATENT DOCUMENTS

| EP | 1 361 712 A1 | 11/2003 |
| KR | 2004041943 A | 5/2004 |
| WO | 02/058356 A2 | 7/2002 |
| WO | 2004/021663 A1 | 3/2004 |

OTHER PUBLICATIONS

Open Mobile Alliance: "Multimedia Messaging Service Encapsulation Protocol Candidate Version 1.2" Internet Citation, [Online] Mar. 23, 2004, XP002399503 Retrieved from the Internet: URL:http://www.openmobilealliance.org/>.

(Continued)

*Primary Examiner*—Jinsong Hu
*Assistant Examiner*—Michael Nguyen (57) ABSTRACT

The invention discloses a method for processing a PUSH notification, including: placing non-compressible fields into the Push notification and placing into the PUSH notification a field signifying message type and a field of internal ID after the fields are compressed; determining whether the PUSH notification may be carried in one short message; if yes, having the PUSH notification carried in one short message; otherwise, having the PUSH notification carried in two short messages; determining whether there are any unoccupied bytes in the short message; if yes, determining whether to place the initiator From field into the PUSH notification according to the number of the unoccupied bytes in the short message, and determining whether to compress Subject field and place the Subject field into the PUSH notification; otherwise, terminating the processing flow of the PUSH notification. The present invention may have the PUSH notifications carried in two short messages at most.

6 Claims, 4 Drawing Sheets

U.S. PATENT DOCUMENTS

| | | | |
|---|---|---|---|
| 7,209,955 B1* | 4/2007 | Major et al. | 709/207 |
| 2002/0126708 A1 | 9/2002 | Skog et al. | |
| 2002/0141391 A1* | 10/2002 | Hsu | 370/352 |
| 2003/0086438 A1* | 5/2003 | Laumen et al. | 370/462 |
| 2004/0185832 A1* | 9/2004 | Prenzel et al. | 455/412.1 |
| 2005/0021754 A1* | 1/2005 | Alda et al. | 709/225 |
| 2005/0075093 A1* | 4/2005 | Lei et al. | 455/412.1 |
| 2006/0075134 A1* | 4/2006 | Aalto et al. | 709/238 |

OTHER PUBLICATIONS

WAP Forum: "Wireless Application Protocol, MMS Encapsulation Protocol Version Jan. 5, 2002" WAP Forum Standard, Jan. 5, 2002, pp. 1-39, XP002240781.

European Search Report for European Patent Application No. 05766712.3, dated Oct. 22, 2007.

3GPP TS 23.140 v6.5.0 (Mar. 2004); 3rd Generation Partnership Project; Technical Specification Group Terminals; Multimedia Messaging Service (MMS); Functional description; Stage 2 (Release 6); Global System for Mobile Communications; 174 pages.

WAP Forum: "Wireless Application Protocol, Wireless Session Protocol Specification"; WAP-230-WSP; Approved Version Jul. 5, 2001; 131 pages.

WAP Forum: "Push Access Protocol"; Version Apr. 29, 2001; Wireless Application Protocol; WAP-247-PAP-20010429-a; 49 pages.

English translation of the Written Opinion of the International Searching Aurthority for International Application No. PCT/CN2005/001000; dated Oct. 5, 2005.

* cited by examiner

METHOD FOR PROCESSING PUSH NOTIFICATION IN MULTIMEDIA MESSAGE SERVICE

CROSS-REFERENCE TO RELATED APPLICATIONS

This application is a continuation of International Application No. PCT/CN2005/001000 filed on Jul. 7, 2005. This application claims the benefit of Chinese Patent Application No. 200410069703.6 filed on Jul. 9, 2004. The disclosures of the above applications are incorporated herein by reference.

FIELD

The present disclosure relates to multimedia information communication technology, and particularly to a method for PUSH notification in multimedia message service.

BACKGROUND

The statements in this section merely provide background information related to the present disclosure and may not constitute prior art.

Multimedia Message Service (MMS) is the further development of Short Message Service (SMS) and graphics information transfer, which ensures that the full-function contents and information including graphics, audio information, video information, data and text may be transferred. The MMS may transfer the multimedia information on time from end to end of the mobile phone, and also between mobile phones and the internet. Multimedia Message Service Center (MMSC) is the network element that serves to deliver multimedia messages on networks.

In the process of multimedia message transfer, the MMSC activates the delivery flow when the MMSC receives a multimedia message sent by the MMS terminal, Value Added Service Provider (VASP) or mail server. The issue flow includes two phases: PUSH notification process and message retrieval process. The PUSH notification process of the MMS mainly refers to that the MMSC has the PUSH notification carried in one or plural short message(s) and transfers the notification to the receiving terminal, with the associated information of the multimedia message carried in the PUSH notification: the addressing information required by the receiving terminal for retrieving the multimedia message, deliverer ID, the subject of the multimedia message, and the addressing information of the receiving terminal, of which, the addressing information carries the MMSC address and the sole ID of the multimedia message in the MMSC. The receiving terminal activates the message retrieval process when the receiving terminal receives the short messages and combines them into the PUSH notification, i.e., the receiving terminal initiates a message retrieval request to the MMSC that saves the multimedia messages according to the addressing information carried in the PUSH notification, and retrieves the multimedia messages.

In the international standard specifications, the PUSH notification message includes:

TID: transaction identification, whose length is 1 byte;

Type: signifying message type; the Type signifies that the message is a PUSH notification when the value is 0x06, and length of the Type is 1 byte;

HeaderLen: signifying the length of the message header; the HeaderLen adopts unitary codes, whose length is 1 byte;

ContentType: signifying message body type; in the case of the PUSH notification of MMS, there are two expressing ways: one way is character string application/vnd.wap.mms-message that takes up 32 bytes, and the other way is expressed with binary codes 0x3E that takes up 1 byte, preferably the ContentType adopts the expressing way of character string in most cases.

Headers: signifying the contents of the message header; length of the Header is equal to the difference between the value of the HeaderLen field and the length of the Content-Type field;

X-Mms-Message-Type: signifying MMS protocol data unit type; The value of the PUSH notification message is 130, whose length is 1 byte;

X-Mms-Transaction-ID: the internal ID assigned by the MMSC to ensure that the receiving party is able to retrieve the multimedia message correctly; whose length and coding rule are assigned and identified by the MMSC, and the length is variable;

X-Mms-MMS-Version: signifying the version of MMS, whose length is 2 bytes;

From: signifying the initiator of a multimedia message, whose minimum length is 4 bytes;

Subject: signifying the subject of the multimedia message; After the multimedia message is coded by UTF-8, the minimum length of Subject is 6 bytes when the length of the multimedia message is greater than or equal to 31 bytes, otherwise the minimum length of the Subject is 5 bytes;

X-Mms-Message-Class: signifying the class of the multimedia message; For instance, if the multimedia message belongs to individual, advertisement or class of information; the length of the X-Mms-Message-Class is 2 byte;

X-Mms-Message-Size: signifying the length of the multimedia message, whose length is 5 or 6 bytes after adopting long integer codes;

X-Mms-Expiry: signifying the valid term of a multimedia message, whose length is 7 or 8 bytes;

X-Mms-Content-Location: signifying the address of Unitary Resource Identification (URI) for a multimedia message, at least including the address of MMSC and the transaction ID of the multimedia message, of which, the address of MMSC may be an IP address and a port number, or a domain name whose length is variable, and also the length of this part is variable.

The PUSH notification processed with the above format is sent to the receiving party by the multimedia message initiating party via plural intermediate links. And the PUSH notification includes the message retrieval process before the accomplishment of delivering a multimedia message. The delivery processes of a multimedia message are similar in GSM, GPRS, WCDMA, CDMA95, CDMA2000 and other networks, therefore, the delivery process of a multimedia message in GSM is taken as the example for a description of the technical solution.

The PUSH notification of multimedia message may be delivered via Wireless Application Gateway (WAPGW) or by MMSC directly.

Figure 1:
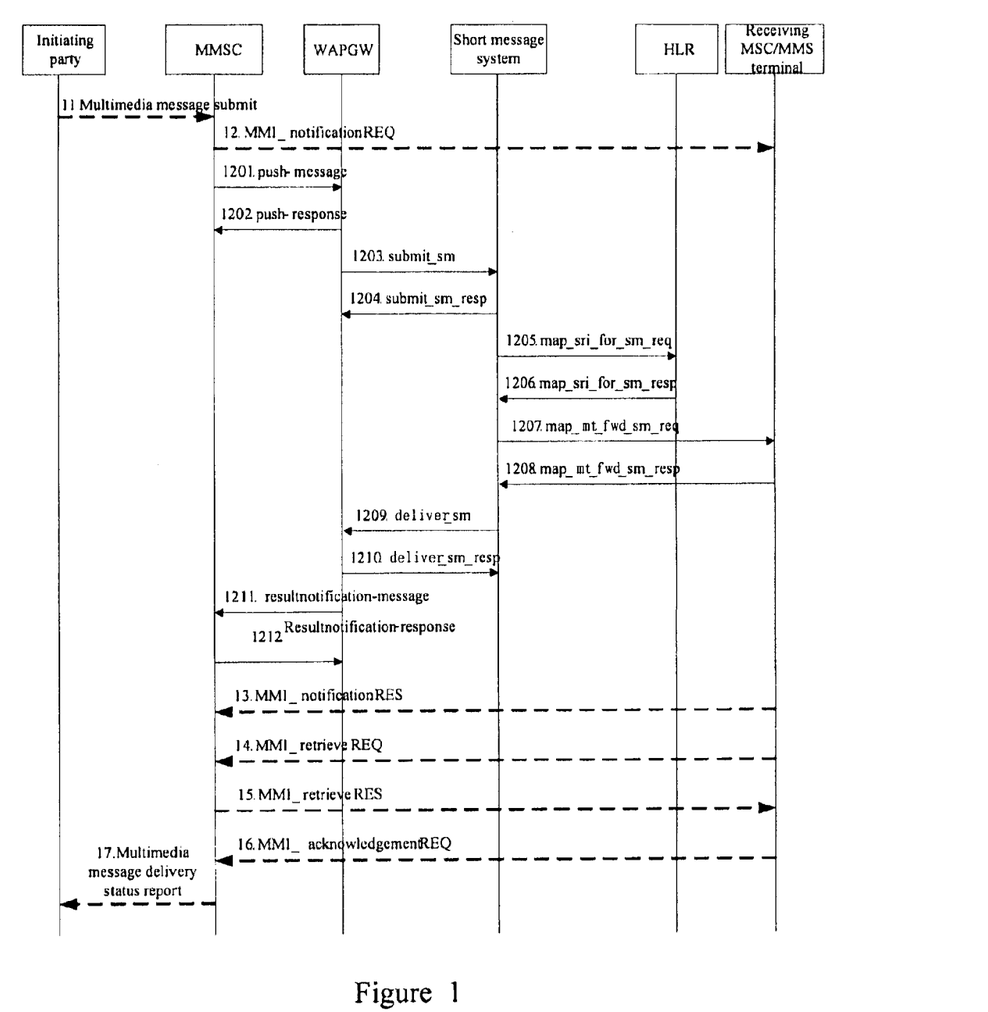
FIG. 1 is a flow chart illustrating the traditional flow of issuing a multimedia message via the WAPGW.

FIG. 1 illustrates the process that the initiating party such as an MMS terminal, a VASP or a mail server sends a multimedia message adopting the PUSH notification of the existing format to the receiving party via WAPGW, including:

Steps 11~12: The initiating party of the multimedia message submits the multimedia message to be delivered to the MMSC, Having received the multimedia message, the MMSC activates the PUSH notification flow to issue the PUSH notification to the receiving MMS terminal.

The specific process to issue the PUSH notification includes:

Step 1201: The MMSC sends to the WAPGW a push_message carrying the PUSH notification, and records the times to execute this step.

Step 1202: The WAPGW returns a push-response to the MMSC after the WAPGW receives the push-message.

Step 1203: The WAPGW adopts the interface protocol between the WAPGW and the short message system to pack up the PUSH notification in the push-message into a short message, sends a submit message submit_sm to the short message system, and records the times to execute this step.

The short message system herein includes Short Message Service Center (SMSC) and short message gateway. The interface protocol between the WAPGW and the short message system may be Short Message Peer to Peer Protocol (SMPP), Universal Computer Protocol (UCP), Computer Interface Message Delivery Protocol (CIMD) or other protocols of the same type.

Step 1204: The short message system returns a response message submit_sm_resp to the WAPGW after the short message system receives the submit_sm.

Thereafter, the short message system issues a short message to the receiving party MSC/MMS terminal.

Step 1205: The short message system determines the address of the receiving MMS terminal's Home Location Register (HLR) according to the address information of the receiving party carried in the PUSH notification of submit_sm, sends a router request message map_sri_for_sm_req to the HLR, and records the number of times to execute this step.

Step 1206: Having received the map_sri_for_sm_req, The HLR returns to the short message system a router response message map_sri_for_sm_resp carrying the address of the Mobile Switch Center (MSC) in which the receiving party is currently located.

Steps 1207~1208: The short message system sends by short message to the receiving party a request message map_mt_fwd_sm_req to issue a short message carrying the PUSH notification according to the router information carried in the response message map_sri_for_sm_resp, and the receiving party returns to the short message system a map_mt_fwd_sm_resp, indicating whether the PUSH notification has been issued successfully. Thereafter, the receiving party determines whether the SMSC has received in a preset time the map_mt_fwd_sm_resp carrying the information indicating the PUSH notification has been successfully issued; if yes, carries out Step 1209; otherwise, the short message system selects whether to reissue the notification and the reissuing time according to the internal reissue strategy; the short message system determines whether the times Step 1205 executed has exceeded the preset value when the short message system is about to reissue the notification, and if the times Step 1205 executed has exceeded the preset times, the short message system determines that the issue of the PUSH notification failed and carries out Step 1209; if the times Step 1205 executed has not exceeded the preset times, the short message system adopts the reissue strategy and returns to Step 1205.

Up to now, the flow that the short message system issues a short message to the MSC/MMS terminal of the receiving party is accomplished.

Steps 1209~1210: The short message system sends to the WAPGW a deliver_sm, indicating whether the PUSH notification has been issued successfully. Having received the deliver_sm, the WAPGW returns to the short message system a delivery report response deliver_sm_resp, and determines whether the PUSH notification has been issued successfully according to the deliver_sm; if yes, proceed to Step 1211; otherwise, the WAPGW determines whether to reissue the notification according to the internal reissue strategy; the WAPGW determines whether the times Step 1203 executed has exceeded the preset value when the WAPGW is about to reissue the notification, and if the times Step 1203 executed has exceeded the preset times, the WAPGW determines that the issue of the PUSH notification failed and carries out Step 1211; if the times Step 1203 executed has not exceeded the preset times, the WAPGW adopts the reissue strategy and returns to Step 1203.

Steps 1211~1212: The WAPGW sends to the MMSC a result notification message resultnotification-message, indicating whether the PUSH notification has been issued successfully. The MMSC returns to the WAPGW a response message resultnotification-response after the MMSC receives the result notification message, and determines whether the PUSH notification has been issued successfully according to the received message; if yes, the MMSC terminates the flow of the PUSH notification; otherwise, the MMSC selects whether to reissue the notification and the reissuing time according to the internal reissue strategy; the MMSC determines whether the times Step 1201 executed has exceeded the preset value when the MMSC is about to reissue the notification, and if the times Step 1201 executed has exceeded the preset times, the MMSC determines that the issue of the PUSH notification failed, terminates the delivery flow of the PUSH notification, and carries out Step 17; if the times Step 1201 executed has not exceeded the preset times, the MMSC adopts the reissue strategy and returns to Step 1201.

Up to now, the flow of the PUSH notification has been completed.

Steps 13~16: The MMSC interacts with the receiving MSC/MMS terminal to retrieve the message.

Step 17: The MMSC sends to the initiating party a multimedia message delivery status report, indicating whether the receiving party has successfully received the multimedia message.

When the issue of the PUSH notification has been completed, the initiating party and the receiving party retrieve the multimedia message according to the message retrieval flow from Step 13 to Step 17 to accomplish the delivery of the multimedia message.

Figure 2:
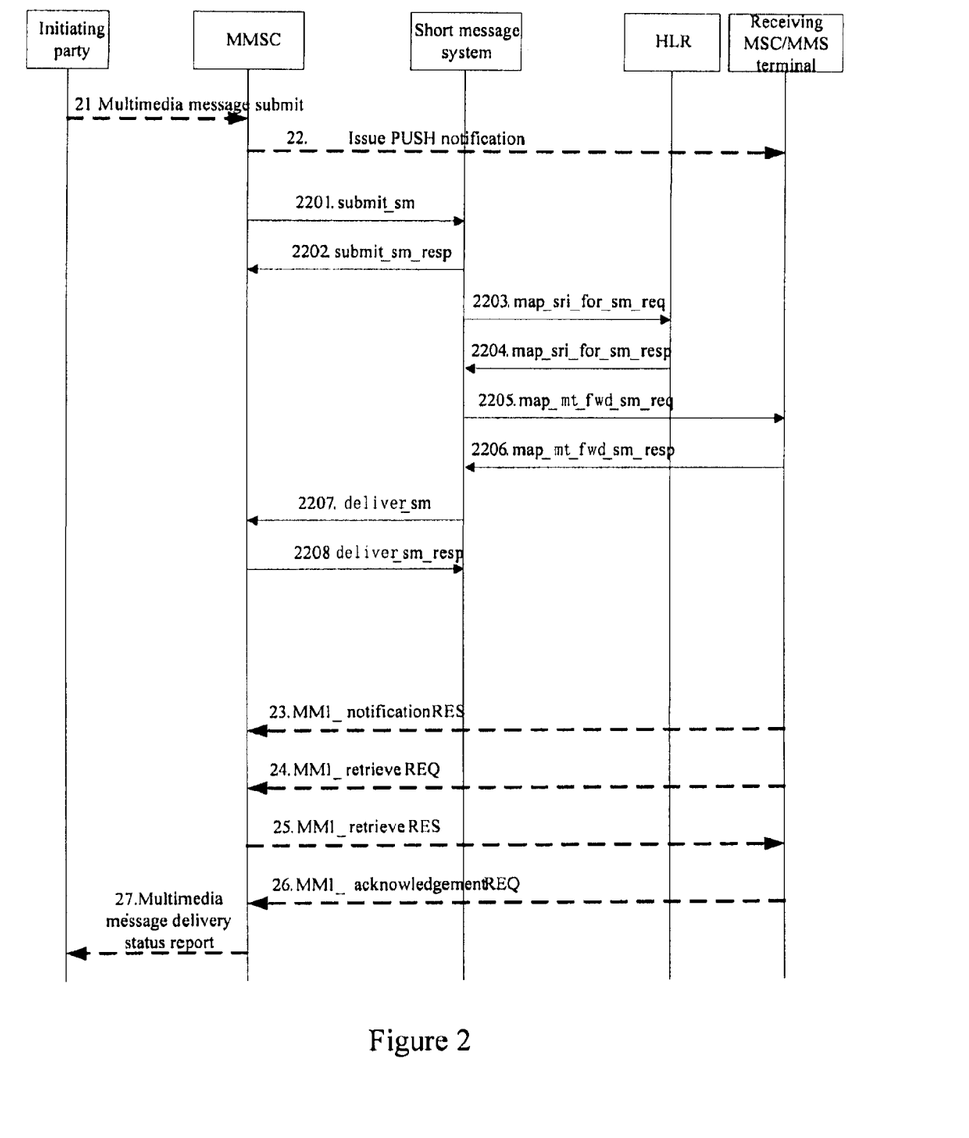
FIG. 2 is a flow chart illustrating the traditional flow of issuing a multimedia message via the MMSC directly.

The foregoing is the flow to issue a multimedia message via the WAPGW, and the following is the flow to issue a multimedia message directly by the MMSC.

FIG. 2 illustrates the process to issue a multimedia message adopting the PUSH notification of the existing format directly by the MMSC to the receiving party, including:

Steps 21~22: The initiating party of the multimedia message submits the multimedia message to the MMSC, Having received the multimedia message, the MMSC activates the PUSH notification process and issue the PUSH notification to the receiving party.

The PUSH notification process herein includes:

Step 2201: The MMSC adopts the interface protocol that is able to communicate with the short message system to pack up the PUSH notification into short message, sends by the interface protocol to the short message system a submit message submit_sm carrying the PUSH notification, and records the number of times to execute this step.

Step 2202: The short message system returns to the MMSC a response message submit_sm_resp upon receiving the submit_sm.

Thereafter, the short message system issues a short message to the receiving party.

Step 2203: The short message system determines the address of the receiving party's HLR according to the address information of the receiving party carried in the PUSH notification in submit_sm, sends a router request message map_sri_for_sm_req to the HLR, and records the number of times to execute this step.

Step 2204: Having received the map_sri_for_sm_req, the HLR returns to the short message system a router response message map_sri_for_sm_resp, indicating the address of the MSC in which the receiving party is currently located.

Steps 2205~2206: The short message system sends by short message to the receiving party a request message map_mt_fwd_sm_req to issue a short message carrying the PUSH notification according to the router information carried in the response message map_sri_for_sm_resp, and the receiving party returns to the short message system a map_mt_fwd_sm_resp, indicating whether the PUSH notification has been issued successfully. Thereafter, the short message system determines in a preset time whether the short message system has received the map_mt_fwd_sm_resp carrying the information indicating the PUSH notification has been issued successfully; if yes, proceed to Step 2207; otherwise, the short message system selects whether to reissue the notification and the reissuing time according to the internal reissue strategy; the short message system determines whether the times Step 2203 executed has exceeded the preset value when the short message system is about to reissue the notification, and if the times Step 2203 executed has exceeded the preset times, the short message system determines that the issue of the PUSH notification has failed and carries out the next step; if the times Step 2203 executed has not exceeded the preset times, the short message system adopts reissue strategy and returns to Step 2203.

Up to now, the flow that the short message system issues the short message to the receiving party is accomplished.

Steps 2207~2208: The short message system sends to the MMSC a delivery report message deliver_sm, indicating whether the PUSH notification has been issued successfully. Having received the deliver_sm, the MMSC returns to the short message system a delivery report response deliver_sm_resp, and determines whether the PUSH notification has been issued successfully according to the delivery report message; If yes, terminates the PUSH notification flow; Otherwise, the MMSC selects whether to reissue the notification and the reissuing time according to the internal reissue strategy; determining whether the times Step 2201 executed has exceeded the preset value when the MMSC is to reissue the notification, and if the times Step 2201 executed has exceeded the preset times, the MMSC determines that the issue of the PUSH notification has failed and terminates the delivery flow of the multimedia message, and determines that the delivery of the multimedia message failed and carries out Step 27; if the times Step 2201 executed has not exceeded the preset times, the MMSC adopts the reissue strategy and returns to Step 2201.

Up to now, the PUSH notification flow has been completed.

Steps 23~26: The MMSC interacts with the receiving MSC/MMS terminal to retrieve the message.

Step 27: The MMSC sends to the initiating party a multimedia message delivery status report, indicating whether the receiving party has received the multimedia message successfully.

When the issue of the PUSH notification has been completed, the initiating party and the receiving party retrieve the multimedia message according to the message retrieval flow from Step 23 to Step 27 to accomplish the delivery of the multimedia message.

GSM, GPRS, WCDMA, CDMA95, CDMA2000, and other mobile and fixed networks may all adopt the networking mode illustrated in FIG. 2, i.e., the MMSC adopts the associated interface protocol to carry out communication with the short message systems of various mobile networks or fixed networks directly to accomplish the multimedia message delivery, for instance, in the CDMA network, the MMSC may directly connect with the CDMA short message center (MC) to accomplish the multimedia message delivery.

The two flows mentioned above indicate that the PUSH notification is critical to the whole MMS business, and is an essential requisite to ensure that the receiving party obtains information normally. When the contents of the PUSH notification exceed the maximum length that a short message may hold, the WAPGW or the short message system may divide the PUSH notification into plural short messages to issue. When the PUSH notification is divided by the WAPGW, the forgoing Steps 1203~1210 will be executed many times to complete delivery of the PUSH notification; And when the PUSH notification is divided by the short message system, the forgoing processes 1205~1208 or the foregoing processes 2203~2206 will be executed many times to complete delivery of the PUSH notification;

To be specific, in accordance with the method for processing the PUSH notification in the prior art, because the maximum length of a short message is 140 bytes, while the total length of a PUSH notification exceeds 140 bytes, a PUSH notification may be divided into plural short messages for delivery, and the receiving party should wait for the arrival of all the short messages carrying the same PUSH notification before the receiving party assembles them into a complete PUSH notification.

It leads to complex and legionary links in the PUSH notification flow to adopt plural short messages carrying one PUSH notification. Additionally, if delivery of a short message fails, it is hard to coordinate the reissue mechanisms of the MMSC and WAPGW with existence of WAPGW, and it is unable to determine accurately the short message that should be reissued, therefore, the success rate of PUSH notification is low and the service quality of the multimedia message business is seriously affected.

The division of one PUSH notification into plural short messages leads to legionary intermediate links and high operational cost.

SUMMARY

In view of the above, embodiments of the present invention provide a method for processing a PUSH notification to shorten the time delay between the issue and the receipt of the PUSH notification.

The method includes:

placing non-compressible fields of the PUSH notification into the PUSH notification, compressing a Type field signifying message type and a Transaction identification (TID) field of Internal ID, and placing the compressed Type field and the compressed TID field into the PUSH notification;

determining whether the PUSH notification can be carried in one short message; if the PUSH notification can be carried in one short message, having the PUSH notification carried in one short message; if the PUSH notification cannot be carried in one short message, having the PUSH notification carried in two short messages;

determining whether there are unoccupied bytes in the short message; if there are unoccupied bytes in the short message, determining whether placing a From field signifying an initiator of the message into the PUSH notification according to number of the unoccupied bytes in the short message, and determining whether compressing a Subject field as well as placing the Subject field into the PUSH notification according to number of the unoccupied bytes in the short message; if the From field has already been put into the short message, whereas there are no enough bytes in the short message to hold the Subject field, discarding the Subject field; if there are unoccupied bytes in the short message, but the From field cannot be hold in the short message, discarding the From field and the Subject field that are not placed into the PUSH notification.

Embodiments of the present invention are applied to compress some of the fields in the PUSH notification so that they may occupy fewer bytes, therefore, a PUSH notification may be held with two short messages at most for delivery. Some embodiments of the present invention have the following advantages.

Some embodiments of the present invention ensure including the 10 non-compressible fields as well as ContentType and X-Mms-Transaction-ID fields of the PUSH notification, so as to guarantee the integrity of the PUSH notification's key information.

Because the compressible fields in the PUSH notification are expressed with fewer bytes, some embodiments of the present invention diminish the total length of the PUSH notification, and thereby a PUSH notification may be carried in two short messages at most, therefore, the method disclosed by embodiments of the present invention lower data quantity for transfer, shortens the time delay, and raises the transfer efficiency.

Because a PUSH notification may be held with two short messages at most, some embodiments of the present invention diminish the times to execute the short message issue flow in the delivery process of the multimedia messages, shorten the executing time of the intermediate links and lower the operational cost.

Because a PUSH notification may be held with one short message or two, some embodiments of the present invention may easily determine the short message that should be reissued when the short message delivery fails.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to make technical solution of the present invention clearer, a detailed description of the present invention is hereinafter given with reference to the attached drawings and embodiments.

The embodiments of the present invention provide a method for processing the PUSH notification in multimedia message service, and its key idea is: choose some fields which are optional or with variable length in the PUSH notification and compress them, so that the PUSH notification may be carried in two short messages at most.

A description of the method for processing the PUSH notification in the embodiments is provided hereinafter with the processes illustrated in FIG. 3 and FIG. 4.

Figure 3:
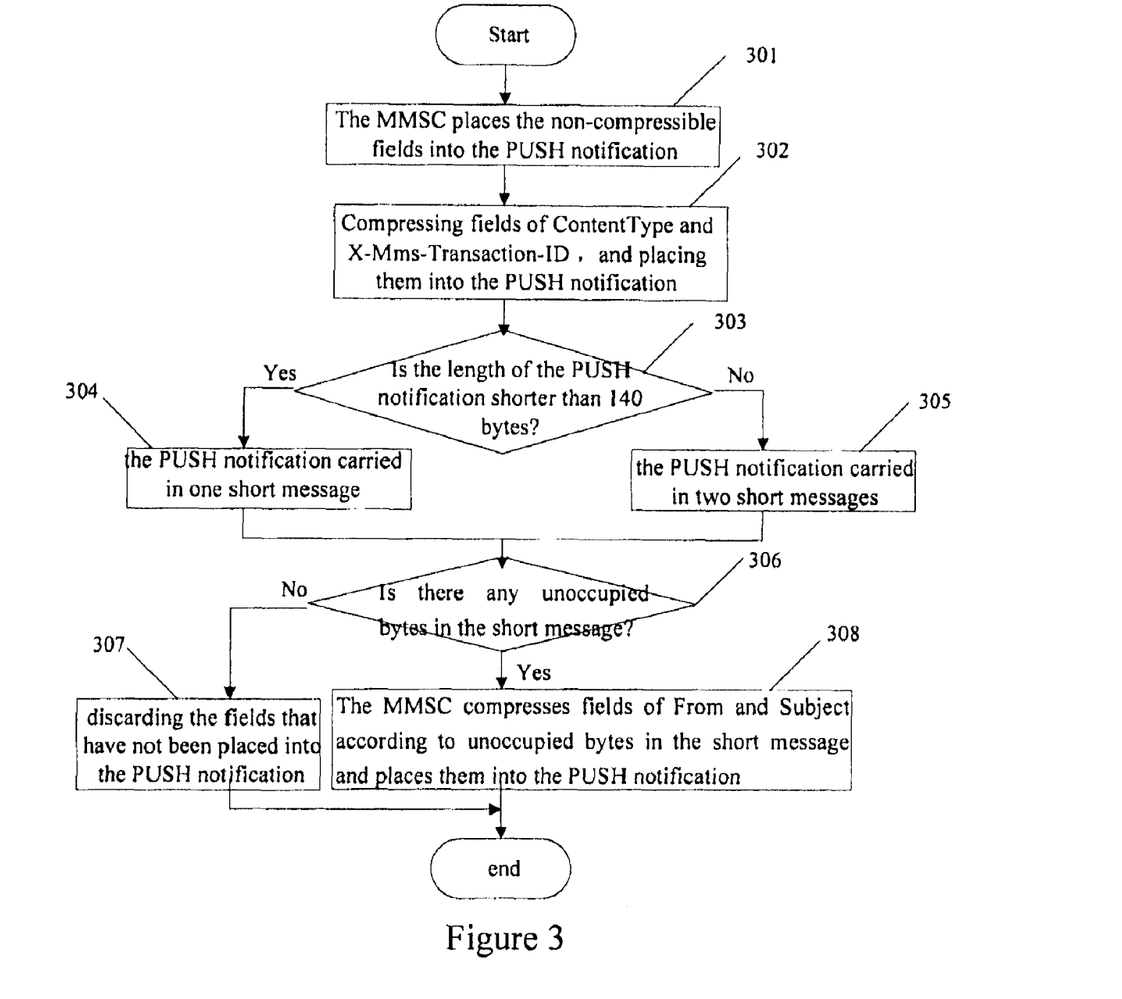
FIG. 3 is a general flow chart illustrating the method for processing the PUSH notification according to an embodiment of the present invention.

As shown in FIG. 3, an embodiment of the method for processing the PUSH notification in multimedia message service according to the present invention includes:

Step 301: placing the non-compressible fields into the Push notification.

In the international standard specifications, the PUSH notification includes 14 fields. Apart from the fields of ContentType, X-Mms-Transaction-ID, From and Subject, the other 10 fields may not change their expression modes, and their occupied bytes may not be compressed. Therefore, in the processing of the PUSH notification, the MMSC places the 10 non-compressible fields into the PUSH notification in this process.

Step 302: compressing the fields of ContentType and X-Mms-Transaction-ID and placing them into the PUSH notification.

In the international standard specification, there are two ways to express the field of the ContentType in the PUSH notification: one way is to express the field with a 32-byte character string application/vnd.wap.mms-message, and the other way is to express the field of the ContentType with binary codes 0x3E that take up 1 byte. In this process, the field is expressed with the binary codes taking up 1 byte to save 31 bytes.

The structure of the X-Mms-Transaction-ID generally is: time+multimedia message service central ID (MMSCID)+message (MSG) serial number+terminal tail number+session serial number. Of which, the functions and occupied bytes of each part are respectively:

Time: signifying the delivery time of the multimedia message; Its format is: mmddHHMMSS, and the Time field occupies 10 bytes;

MMSCID: for identifying MMSC, and the MMSCID field occupies 6 bytes;

MSG serial number: the serial number of the message, and the MSG serial number field occupies 5 bytes;

Terminal tail number: the last two digits of the mobile phone number, used to check the legality, and the Terminal tail number field occupies 2 bytes;

Session serial number: the internal resources assigned by MMSC to the multimedia message, and Session serial number occupies 5 bytes;

The total length of the five parts mentioned above is 28 bytes. X-Mms-Transaction-ID is mainly used by the technical persons in their research work; therefore, this field may be compressed with the following strategy:

a. Discarding MMSCID: when receiving a multimedia message, the terminal gets a domain name and may find the MMSC according to this domain name, therefore, this part may be omitted.

b. Converting the time format from mmddHHMMSS occupying 10 bytes into an integer value of 8 bytes long, i.e., to express the time in seconds. The time is refreshed on January 1 every year, therefore, the maximum value is: 24 hours×60 minutes×60 seconds×366 days=31622400 seconds.

After the foregoing operation, the structure of the X-Mms-Transaction-ID is: time (8 bytes)+MSG serial number (5 bytes)+terminal tail number (2 bytes)+session serial number (5 bytes)=20 bytes. Converting the 20 bytes mentioned above into integer, and the maximum value is $10^{20}-1$, the 20 bytes occupy 18 bytes when adopting hexadecimal codes, and 12 bytes when the X-Mms-Transaction-ID is converted into 64 based number system. Therefore, the 64 based number system saves 16 bytes after compression.

Step 303: determines whether the length of the PUSH notification is shorter than 140 bytes; if yes, proceed to Step 304; otherwise, proceed to Step 305;

As one short message may hold 140 bytes at most, this step wants to determine whether the PUSH notification may be held with one short message.

Step 304: The MMSC has the PUSH notification carried in one short message then carries out Step 306.

Step 305: The MMSC has the PUSH notification carried in two short messages.

In this process, the fields are placed into the first message at first, then into the second message after the first message is full.

Steps 306~307: determining whether there are any unoccupied bytes in the short message; if yes, proceed to Step 308; otherwise, discarding the fields that are not placed into the PUSH notification and terminating the compression flow of the PUSH notification.

If the PUSH notification may be carried in one short message, the method in this process to determine whether there is any unoccupied byte in the short message is: determining whether the total bytes occupied by the 10 non-compressible fields and the fields of compressed ContentType and X-Mms-Transaction-ID are shorter than 140 bytes; if yes, determining that there is/are unoccupied byte(s) in the short message; otherwise, determining that there is no unoccupied byte in the short message.

When the PUSH notification is carried in two short messages, whether there is unoccupied byte in the second short message will be determined in this process.

Step 308: compressing the fields of From and Subject according to the unoccupied bytes in the short message.

In this process, the MMSC determines whether place the fields of From and Subject into the message and the compression mode of Subject field according to the unoccupied bytes in the short message. To be specific, when the unoccupied bytes are enough to hold From field, the MMSC places the field into the Push notification, and compresses Subject field according to the remaining unoccupied bytes; otherwise, terminating the compression flow of the PUSH notification.

Figure 4:
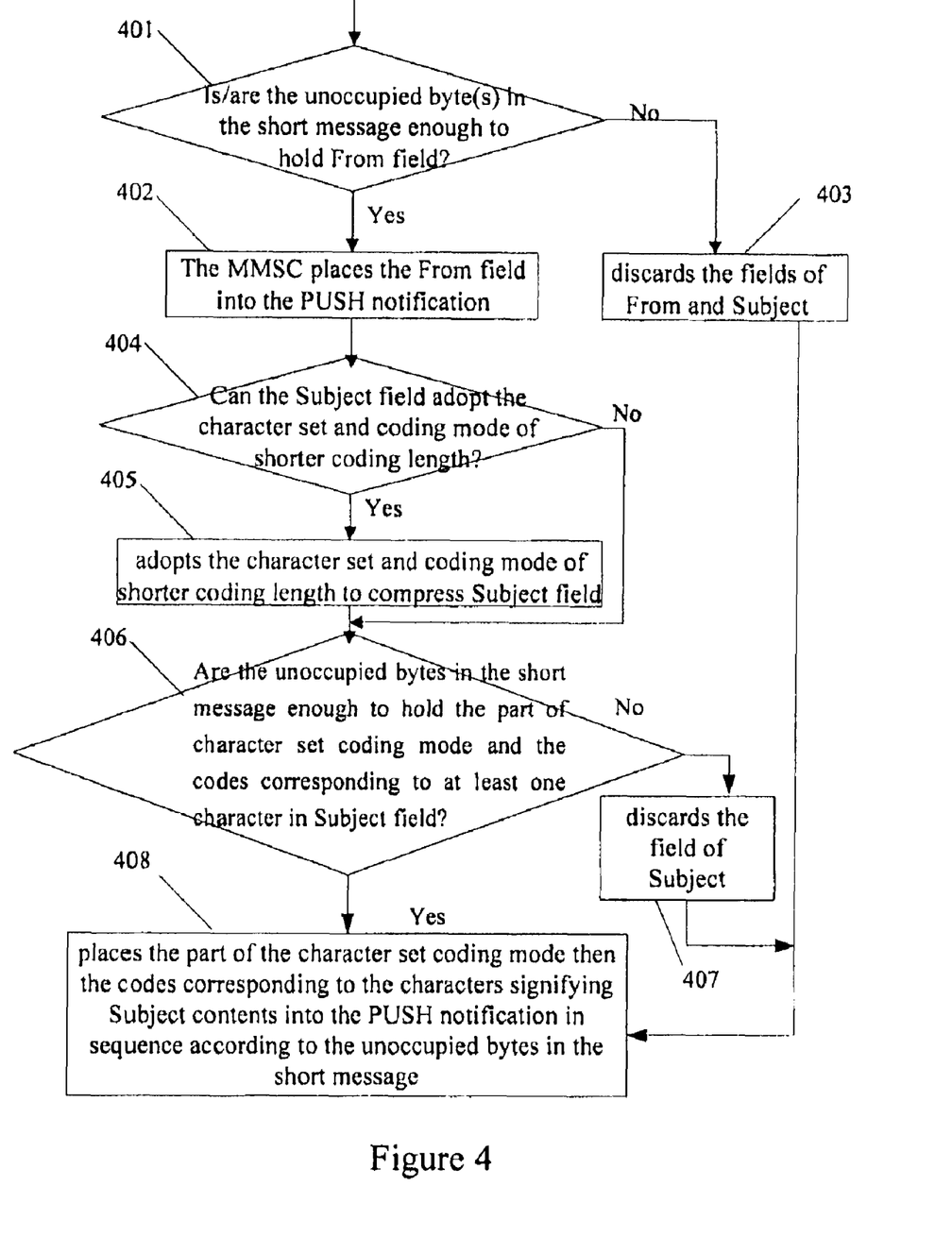
FIG. 4 is a flow chart illustrating the flow to compress Subject field according to an embodiment of the present invention.

As shown in FIG. 4, the process to compress the fields of From and Subject specifically including:

Steps 401~403: The MMSC determines whether the unoccupied bytes in the short message are enough to hold From field; if yes, the MMSC places From field into the Push notification; otherwise, the MMSC discards From field and Subject field and terminates the flow of compressing the fields of From and Subject.

When the unoccupied bytes in the short message are enough to hold the complete field of From, the MMSC may place the field into the Push notification. The MMSC chooses to discard From field in other cases.

Steps 404~405: deciding whether Subject field may adopt another character set or coding mode that may make the coding length shorter than the coding length of the Subject field adopting the already used character set or coding mode; if yes, the character set or coding mode of shorter coding length will be adopted to compress Subject field, and Step 406 is carried out; otherwise, Step 406 is carried out;

The format of the Subject field is: Character string code/character set coding mode. The field may adopt plural character sets and coding modes to express its specific contents, and the numbers of byte occupied by different character sets and coding modes are also different. Therefore, the embodiment of the method in this process to compress Subject field is: on the precondition that the expressed contents of the field are not changed, converting the character sets or coding modes that occupy more bytes into those that occupy fewer bytes. For instance, converting code characters of UTF-8 that take up 6 bytes into code characters of GB 2312 that occupy 2 bytes.

Steps 406~408: deciding whether the unoccupied bytes in the short message are enough to hold the character set coding mode of the Subject field and the codes corresponding to at least one character in Subject; if yes, placing the field of character set or coding mode as well as the codes corresponding to the individual characters serving to express text contents in Subject field into the PUSH notification in sequence according to the number of unoccupied bytes in the short message; otherwise, discarding Subject field and terminating the flow of compressing the fields of From and Subject.

The key idea in this embodiment to compress Subject field is to truncate the field so as to shorten its length. To be specific, the character set coding mode of Subject field serves to express the character set and coding mode adopted by the codes of Subject text contents, and this part may be kept complete instead of being truncated in saving. The part of the character string codes is the specific contents of Subject field, and the part of the character string codes adopts the character set and coding mode specified in the part of character set coding mode. If the adopted character set is N-byte codes, every N-byte code expresses one displayable character. For instance, every character adopts 1-byte codes in ANSI character set, and 6-byte UTF-8 codes in Unicode character set.

When the unoccupied bytes in the short message hereof are enough to hold the character set coding mode of Subject field and the codes corresponding to at least one character; the MMSC places the part of character set coding mode into the PUSH notification at first, then places the codes corresponding to every character into the PUSH notification in sequence from the first character according to the unoccupied bytes in the short message. If the unoccupied bytes may hold the character set or coding mode and are not enough to hold the complete codes of the first character, the Subject field will be discarded. the reason is that: without any codes to signify Subject contents, the character set or coding mode is useless even if there exists the character set or coding mode of Subject field; if the unoccupied bytes are not enough to hold the character set coding mode, the Subject field will be discarded and the flow of compressing the fields of From and Subject will be terminated.

It should be noted that, because every N-byte code expresses one displayable character, it may be ensured that the character string codes placed into the PUSH notification should be an integral multiple of N bytes, i.e., the last N bytes placed into the PUSH notification may be the code of the same original character. If the codes of the last original character may not be held completely, all the coding bytes of the character are discarded. For instance, when there are K unoccupied bytes in the short message, the MMSC carries out rounding operation on the quotient of K by N; if the rounding result is m, the codes corresponding to the characters from the first one to m of the character string coding part in Subject field will be placed into the PUSH notification.

In the method for processing the PUSH notification according to the notification, when a multimedia message is delivered via the WAPGW, the field of the ContentType is compressed by the WAPGW, and the other fields are compressed by the MMSC; When the multimedia message is delivered to the short message system directly by the MMSC, all the fields are compressed by the MMSC.

With the PUSH notification in multimedia message service processed with the method of the embodiment according to the invention, the method effectively shortens the length overall and diminishes the occupied bytes, and thereby simplifies the delivery flow of the multimedia messages. In the case of a compressed PUSH notification of the multimedia message, Steps 1203~1210 illustrated in FIG. 1 will be executed twice at most to complete the delivery of one PUSH notification when the multimedia message is delivered via the WAPGW, and executes Steps 1205~1208 illustrated in FIG. 1 or Steps 2203~2206 in FIG. 2 twice at most to complete the delivery of one PUSH notification when the multimedia message is delivered via the short message system directly.

GSM, GPRS, WCDMA, CDMA95, CDMA2000, and other mobile and fixed networks all provide multimedia message service; therefore, all the PUSH notifications in the networks mentioned above may be processed with the method of the embodiments of the invention.

The foregoing description is preferred embodiments of this invention and is not used for limiting the protection scope thereof. All the modifications, equivalent replacements or improvements in the scope of the present invention's sprit and principles shall be included in the protection scope of the present invention.

What is claimed is:

1. A method for processing a PUSH notification in multimedia message service, comprising:

placing, by a Multimedia Message Service Center, MMSC, non-compressible fields of the PUSH notification into the PUSH notification, compressing a ContentType field signifying message body type and an X-Mms-Transaction ID field of Internal ID, and placing the compressed ContentType field and the compressed X-Mms-Transaction ID field into the PUSH notification;

determining, by the MMSC, whether the PUSH notification can be carried in one short message; if the PUSH notification can be carried in one short message, having the PUSH notification carried in one short message; if the PUSH notification cannot be carried in one short message, having the PUSH notification carried in two short messages;

determining, by the MMSC, whether there are unoccupied bytes in the short message; if there are unoccupied bytes in the short message, determining whether placing a From field signifying an initiator of the message into the PUSH notification according to the number of the unoccupied bytes in the short message, and determining whether compressing a Subject field as well as placing the Subject field into the PUSH notification according to the number of the unoccupied bytes in the short message; if the From field has already been put into the short message, whereas there are no enough bytes in the short message to hold the Subject field, discarding the Subject field; if there are unoccupied bytes in the short message, but the From field cannot be hold in the short message, discarding the From field and the Subject field that are not placed into the PUSH notification wherein, the processes of determining whether to place the initiator From field into the PUSH notification and whether to compress the Subject field and place the Subject field into the PUSH notification comprises:

determining, by the MMSC, whether the unoccupied bytes in the short message are enough to hold the From field, if the unoccupied bytes in the short message are not enough to hold the From field, discarding the From field and the Subject field, and terminating the processes of the PUSH notification; otherwise placing the From field into the Push notification;

determining, by the MMSC, whether the Subject field may adopt a character set or a coding mode to make a coding length of the Subject field shorter; if the Subject field may adopt the character set or a coding mode to make the coding length of the Subject field shorter, adopting the character set or the coding mode of shorter coding length to express the Subject field; otherwise, adopting originally used character set or coding mode;

determining, by the MMSC, whether the unoccupied bytes in the short message, after holding the From field, are enough to hold the character set or the coding mode of the Subject field and codes corresponding to at least one character in a character string code of the Subject field; if the unoccupied bytes in the short message, after holding the From field, are enough to hold the character set or the coding mode of the Subject field and the codes corresponding to at least one character in the character string code of the Subject field, placing the character set or the coding mode into the PUSH notification, and placing the codes corresponding to an individual character in the character string code into the PUSH notification in sequence according to the unoccupied bytes in the short message; otherwise, discarding the Subject field and terminating the processes of the PUSH notification.

2. The method according to claim 1, wherein the non-compressible fields of the PUSH notification placed into the PUSH notification comprise 10 fields, the 10 fields not including the ContentType field signifying the message body type, the X-Mms-Transaction-ID field signifying the internal ID, the From field signifying the initiator of the message, and the Subject field signifying a subject of the message.

3. The method according to claim 1, wherein, the process of compressing the ContentType field signifying the message type comprises: expressing, by the MMSC, the ContentType field signifying the message type with binary codes that takes up 1 byte.

4. The method according to claim 1, wherein, the process of compressing the X-Mms-Transaction-ID field of the internal ID comprises:

discarding, by the MMSC, a central ID of the multimedia message service in the internal ID, and expressing time part in seconds;

discarding, by the MMSC, the central ID in the field of the internal ID, expressing the time part with seconds and converting the field of the internal ID into codes of 64 based number system.

5. The method according to claim 1, wherein, the process of determining whether the PUSH notification can be carried in one short message comprises:

determining, by the MMSC, whether length of the PUSH notification is shorter than 140 bytes; if length of the PUSH notification is shorter than 140 bytes, the PUSH notification can be carried in one short message; otherwise, the PUSH notification cannot be carried in one short message.

6. The method according to claim 1, wherein, the process of placing the codes corresponding to the individual characters in the part of the character string codes into the PUSH notification in sequence comprises:

determining, by the MMSC, bytes occupied by the codes to express one displayable character in the existing coding mode;

calculating, by the MMSC, a value m according to the unoccupied bytes of the short message holding the character set coding mode and the coding bytes determined according to the existing coding mode, wherein the value m is the number of displayable characters that the short message holds;

placing, by the MMSC, the codes corresponding to the characters from the first one to m of the character string coding part in the Subject field into the PUSH notification in sequence.

\* \* \* \* \*

UNITED STATES PATENT AND TRADEMARK OFFICE
CERTIFICATE OF CORRECTION

| | | |
|---|---|---|
| PATENT NO. | : 7,899,476 B2 | Page 1 of 1 |
| APPLICATION NO. | : 11/619757 | |
| DATED | : March 1, 2011 | |
| INVENTOR(S) | : Weiming Cheng et al. | |

It is certified that error appears in the above-identified patent and that said Letters Patent is hereby corrected as shown below:

In the Title Page:

Item (57), Abstract, Line 3 "Push" should be --PUSH--.

In the Claims:

Column 11, Line 66, "no" should be --not--.

Column 12, Line 2, "hold" should be --held--.

Column 12, Line 15, "Push" should be --PUSH--.

Column 12, Line 51, "takes" should be --take--.

Signed and Sealed this
Third Day of May, 2011

David J. Kappos
*Director of the United States Patent and Trademark Office*